United States Patent [19]
Rahn

[11] Patent Number: 5,725,261
[45] Date of Patent: Mar. 10, 1998

[54] IDENTIFICATION TAG AND ANCHOR FOR USE IN DISPLAYING INDICIA INCLUDING GRAPHICS AND TEXT

[75] Inventor: Erwin P.G. Rahn, Rochester, N.Y.

[73] Assignee: MFI Associates, Inc., Rochester, N.Y.

[21] Appl. No.: 574,714

[22] Filed: Dec. 20, 1995

[51] Int. Cl.$^6$ ............................ B65D 55/00; F16B 19/00
[52] U.S. Cl. ...................................... 292/307 R; 411/508
[58] Field of Search ........................... 411/508, 509, 411/913; 292/307 R

[56] References Cited

U.S. PATENT DOCUMENTS

| | | |
|---|---|---|
| 2,649,884 | 8/1953 | Westover .................... 411/913 |
| 2,956,605 | 10/1960 | Rapata ........................ 411/913 |
| 3,053,357 | 9/1962 | Stanger ....................... 411/913 |
| 3,245,697 | 4/1966 | Nugent . |
| 3,352,195 | 11/1967 | Fisher ......................... 411/913 |
| 3,358,551 | 12/1967 | Seckerson ................... 411/913 |
| 3,405,688 | 10/1968 | Gerhardi . |
| 3,552,051 | 1/1971 | Ritchey . |
| 3,628,816 | 12/1971 | Ross, Jr. ..................... 411/913 |
| 3,701,373 | 10/1972 | Wronke et al. ............ 411/913 |
| 3,731,414 | 5/1973 | Murphy et al. . |
| 3,949,708 | 4/1976 | Meeks . |
| 4,000,744 | 1/1977 | Ritchey . |
| 4,120,303 | 10/1978 | Villa-Massone et al. . |
| 4,176,482 | 12/1979 | Steckel . |
| 4,184,453 | 1/1980 | Ritchey . |
| 4,330,350 | 5/1982 | Andrews . |
| 4,366,777 | 1/1983 | Akhavein et al. . |
| 4,425,874 | 1/1984 | Child . |
| 4,428,327 | 1/1984 | Steckel . |
| 4,506,630 | 3/1985 | Hair . |
| 4,581,834 | 4/1986 | Zatkos et al. . |
| 4,597,208 | 7/1986 | Chevillot . |
| 4,612,877 | 9/1986 | Hayes et al. . |
| 4,635,389 | 1/1987 | Oudelette . |
| 4,687,526 | 8/1987 | Wilfert . |
| 4,694,781 | 9/1987 | Howe et al. . |
| 4,718,374 | 1/1988 | Hayes . |
| 4,748,757 | 6/1988 | Howe . |
| 4,760,495 | 7/1988 | Till ............................. 411/509 |
| 4,920,671 | 5/1990 | Zatkos . |
| 4,952,107 | 8/1990 | Dupree ....................... 411/508 |
| 4,978,266 | 12/1990 | Becker et al. .............. 411/508 |
| 4,999,065 | 3/1991 | Wilfert . |
| 5,016,368 | 5/1991 | Cassata . |
| 5,016,369 | 5/1991 | Parry . |
| 5,020,951 | 6/1991 | Smith ......................... 411/508 |
| 5,073,222 | 12/1991 | Fry . |
| 5,152,249 | 10/1992 | Howe . |
| 5,283,093 | 2/1994 | All . |
| 5,283,966 | 2/1994 | Rader et al. . |
| 5,507,610 | 4/1996 | Benedetti et al. .......... 411/509 |

FOREIGN PATENT DOCUMENTS 233321  4/1961  Australia ................................ 411/508

*Primary Examiner*—Rodney M. Lindsey
*Attorney, Agent, or Firm*—Cumpston & Shaw

[57] ABSTRACT

The present invention relates to a tag assembly which includes an anchor and an identification tag with human and machine readable media covered by a protective thermoplastic transparent layer of plastic including the ultimate application thereof.

3 Claims, 2 Drawing Sheets

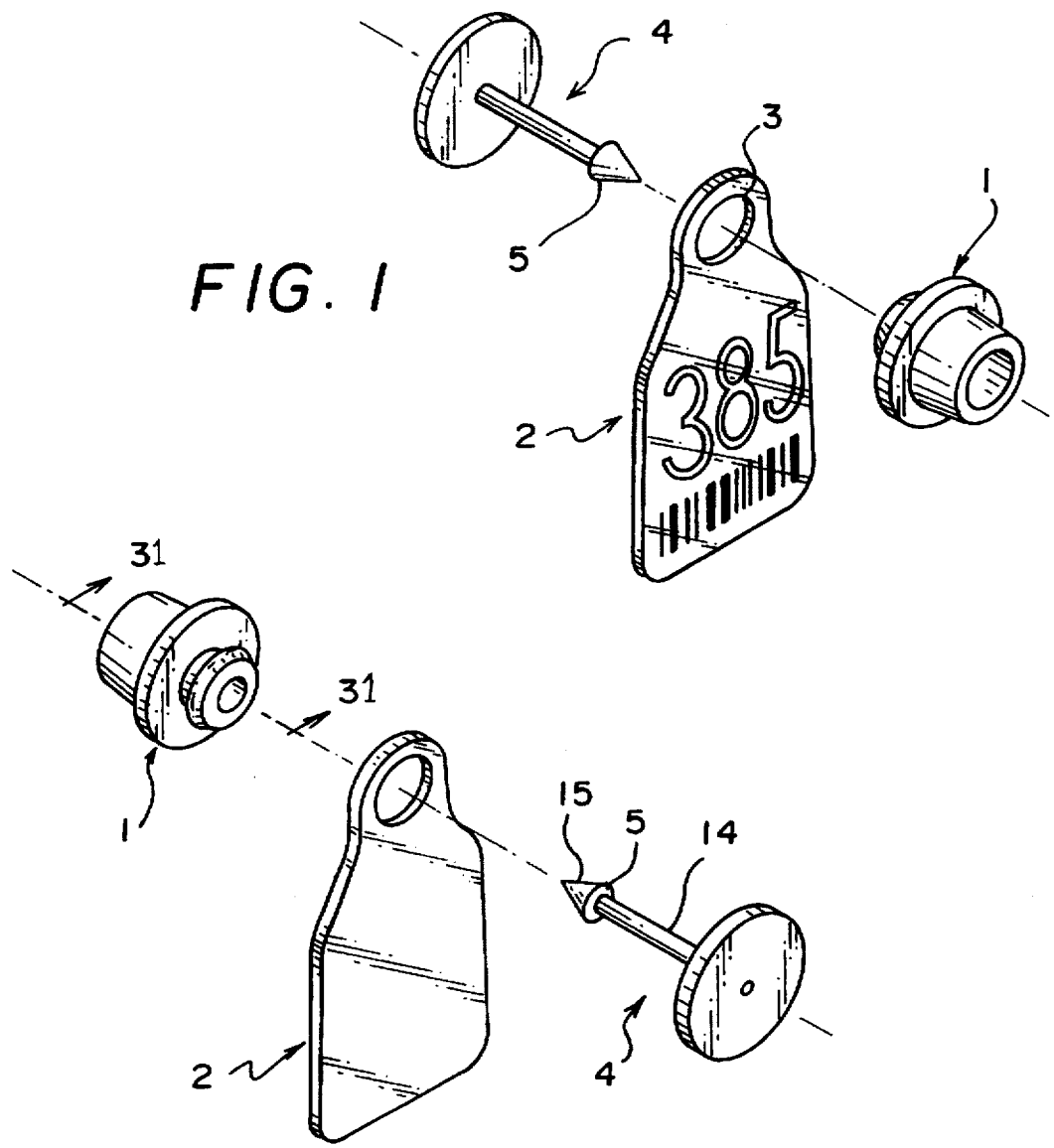
FIG. 1
FIG. 2
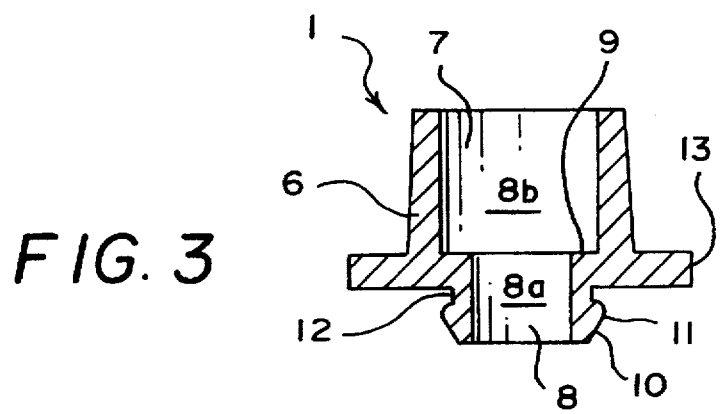
FIG. 3

IDENTIFICATION TAG AND ANCHOR FOR USE IN DISPLAYING INDICIA INCLUDING GRAPHICS AND TEXT

FIELD OF INVENTION

The present invention generally relates to identification tag assemblies and more specifically, a tag assembly including an anchor for use with an indicia bearing identification tag.

BACKGROUND OF THE INVENTION

Identification tags and identification cards have been used throughout the years for a variety of applications, in different configurations and assemblies, and have been made of various materials.

It is further well known that tags designed for attachment to parts of animals comprise two components, a male part having a pointed pin portion at the end of a shaft which is adapted to be forced through a skin fold or an ear of the animal with the help of an applicator in the form of pliers and a female part having a hole through which the pointed end of the male part is forced and retained by the flare-out at the bottom of the pointed end of the pin.

Commonly used male parts of animal identification tags are described and covered by such U.S. Pat. Nos. 4,581,834, 4,597,208, 4,635,389, 4,694,781, 4,920,671, and 5,152,249, many of them marketed commercially in the United States under the trade names "Temple" by Temple Tag Co., Temple, TX; "Fearing" by Fearing Mfg. Co., South Saint Paul, MN; "Allflex" by Allflex Tag Co., Los Angeles, CA; "Permaflex" by K-Products Group, Aberdeen, SD; and "All American" by Y-Tex Corp., Cody, WY. These male components are commonly applied with tools generally of the appearance of a modified pair of pliers like the "Apollo Tag Applicator" and others as described in U.S. Pat. Nos. 3,731,414, 4,597,208, 4,748,757, 4,920,671, 4,120,303 and 5,152,249. While these lists are not by any means exhaustive, they are indicative of devices and tools used for attachments to livestock and animals for purposes of identification in form of tags.

Many problems occur with identification tags. Many tags tear, break, become dislodged from the goods, or catch on external environs and become lost. The print on identification tags fade or lose their readability due to exposure to the elements and/or time. Many tags can be tampered with such that an alteration of the identification tag may result in confusion, deception, and loss of pecuniary gain. A need exists for a tamper proof, ultraviolet proof, waterproof, durable identification tag assembly which can be securely bound to goods.

In an aspect of this invention, this invention consists of laminating pre-printed plastic substrates under heat and pressure between two sheets of transparent thermoplastic materials at a temperature and pressure sufficient to cause the plastic material to penetrate the interstices of the substrate and form a unitary plastic structure that cannot be delaminated without destruction of the identifying data.

In another aspect, the invention is incorporating a high volume production system in which the lamination of the pre-printed plastic substrate and the two transparent thermoplastic cover materials is accomplished in a continuous roll form laminating process.

In an additional aspect, the invention consists of dye cutting the resulting unitary plastic structure to the format, shape and size desired for the identification tag. As part of this die cutting process, an aperture of the desired dimension is die cut at an appropriate location in the resulting identification tag.

The dimension of the aperture of the tag is conveniently sized so as to fit commonly used male parts of animal tags having an elongated shaft terminating in a flared, pointed surface that is forced through the animal skin fold or ear and the hole into which the tip either comes to rest or into an anchor formed of a suitable material, such as metal, plastic or other resilient material, which has a boss with a hole and a shoulder for fitting over the pointed end of the male spike, whereby the flared surface rests on the shoulder inside the boss of the anchor.

In a further aspect, this invention provides protection of the preprinted text and data contained in the resulting identification tags, especially in an environment that is notoriously hostile and adverse when such identification tags are used for animal and livestock identification.

In another aspect, this invention consists of a method to produce high resolution and high print contrast of both human readable information and machine readable data in the form of a bar code, two dimensional codes or optical character recognition imprints by applying continuous roll form printing and protective thermoplastic overlamination thereof by the aforementioned continuous roll form manufacturing process.

SUMMARY OF THE INVENTION

This invention relates primarily to identification tags having a preprinted layer of plastic material carrying pertinent identification information imbedded between various layers of protective plastic and more particularly to identification tags used for animal identification, and to the method of producing such tags.

The invention relates to an anchor for use with an identification tag, the identification tag having an aperture to receive a portion of an animal-piercing member, the animal piercing member having a retaining surface, comprising a main body including an integral boss having a central aperture therethrough, the boss including a shoulder sized to contact the retaining surface of the animal-piercing member to preclude passage of the retaining surface in a longitudinal direction while permitting passage in an opposite direction; a tapered fitting surface extending from an end of the anchor, the tapered fitting surface having a greater diameter than the aperture of the identification tag; an outer convexly rounded surface intermediate the tapered fitting surface; and a peripheral groove having a diameter less than the diameter of the aperture of the indentification tag.

BRIEF DESCRIPTION OF THE DRAWINGS

FIG. 1 illustrates an exploded view of the tag assembly according to the present invention;

FIG. 2 illustrates an exploded view of an opposite view of the tag assembly;

FIG. 3 is a cross sectional view of the anchor along the line 31 as shown in FIG. 2;

DETAILED DESCRIPTION OF THE INVENTION

Figure 4:
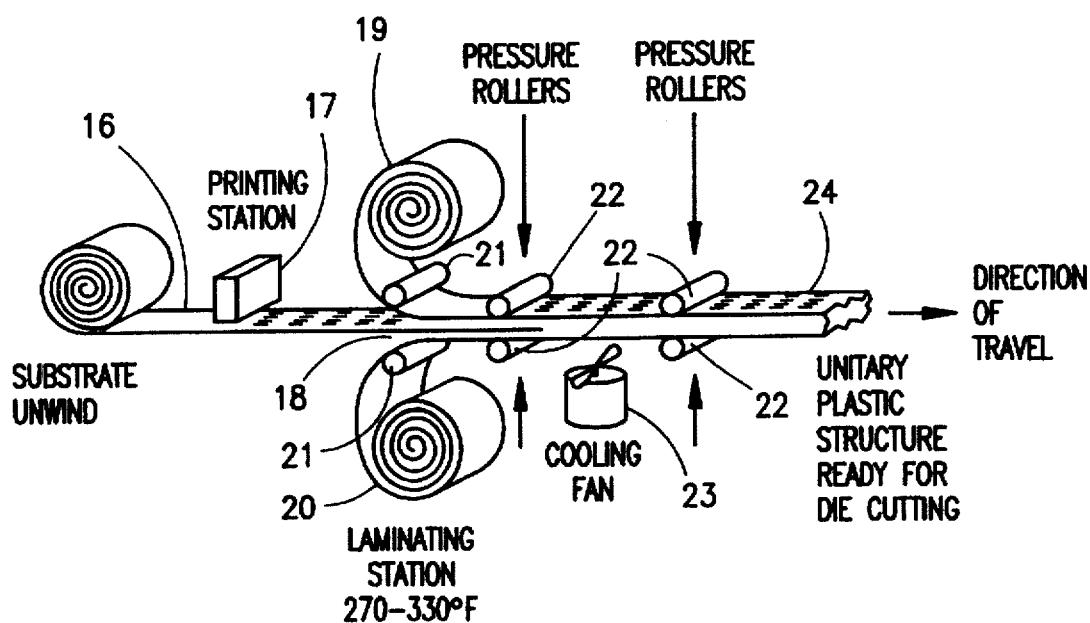
FIG. 4 illustrates the method of printing and the fusing of the tag.

In a preferred embodiment, an anchor 1 is used with an identification tag 2 having an aperture 3 and an animal piercing member 4 having a retaining surface 5 as shown in FIGS. 1 and 2.

The anchor 1 comprises a main body 6 having a boss 7 and a central aperture 8. The central aperture 8 includes a shoulder 9 defining a first diameter 8a and a second larger diameter 8b. (See FIG. 3). Shoulder 9 contacts the retaining surface 5 to preclude passage of the retaining surface 5 in a longitudinal direction while permitting passage in an opposite direction. The anchor 1 includes a tapered fitting surface 10, which extends from one end of the anchor 1, an outer convexly rounded surface 11 and a peripheral groove 12, the convexly rounded surface 11 intermediate the tapered fitting surface 10 and the groove 12. The tapered fitting surface 10 has a greater diameter than the aperture 3. As shown in FIG. 3, the groove 12 has a diameter less than the diameter of the aperture 3 to substantially preclude passage of the identification tag 2 from the groove 12.

The anchor 1 includes a circumferential flange 13 projecting from an outer surface of the body 6. The circumferential flange 13 locates the groove intermediate the shoulder 9 and the tapered fitting surface 10, whereby the flange 13 has a diameter greater than the groove 12. (As shown in FIG. 3). The anchor 1 may be manufactured from any suitable material such as stainless steel, aluminum alloys, polyurethanes, acetyl resins, nylon-6 and polytetraflouroethylene resins. The dimensions of the anchor 1 are conveniently sized so as to fit commonly used male animal-piercing parts 4 having an elongated shaft 14. (As shown in FIG. 2).

Preferably, the boss 7 of the anchor 1 is approximately 0.350" for an inside diameter to 0.490" for an outside diameter. The length of the anchor 1 is preferably 0.525" with the main body 6 having a length approximately of 0.320". The flange 13 has a preferable width of 0.075" while the groove 12 has a preferable width of 0.035". The tapered fitting surface 10 is preferably 0.295" wide with the outer convexly rounded surface 11 having a preferable width of 0.350" to preclude the tag 2 from dislodging from the groove 12.

The invention further comprises a tag assembly. The tag assembly cooperates in conjunction with an animal piercing member or stud 4 having a pointed head 15 and elongate shaft 14 extending from the head. The shaft 14 includes a retaining surface 5 spaced apart from the head 15. The retaining surface 5 has a greater diameter than an adjacent section of the shaft 14. The tag assembly also includes the anchor 1 and the identification tag 2. The shoulder 9 of the main body 6 of the anchor 1 is sized to contact the retaining surface 5 to preclude passage of the retaining surface 5 in a longitudinal direction while permitting passage in an opposite direction.

The identification tag assembly includes a pre-printed substrate 16 (FIG. 4) laminated between thermoplastic films, forming an integral tag 2. (FIGS. 1 and 2). The bonding of the layers produces a tag having sufficient resiliency to preclude destructive delamination of the tag. Further, the identification tag includes an aperture 3 to allow the tag to be disposed onto the anchor 1 or onto the male stud 4.

A method of attaching the tag 2 to an animal comprises passing the head 15 of the elongate shaft 14 through a portion of the animal. The aperture 3 is then disposed about a portion of the stud 4 passing through the animal. The anchor 1 is thus affixed to the shaft 14 to dispose a portion of the tag 2 in the animal intermediate the head 15 and the anchor 1. The aperture 3 is passed over the tapered fitting surface 10 to be disposed in the groove 12. The resiliency of the tag 2 and the tapered fitting surface 10 allow the fit without permanently deforming the aperture 3.

The method of manufacturing the identification tags 2 includes unwinding a printable plastic substrate web 16 onto which desired images are printed at a printer or printing station 17. As illustrated in FIG. 4, the web 16 is fed into a laminating station 18 where unwinding overlaminating films 19 and 20 are thermoplastically fused by appropriate heat shoes 21 and compressed with pressure rollers 22 onto the pre-printed substrate web 16. The laminated web 16 is then cooled at a station by suitable means, preferably a cooling fan, 23, for appropriate handling. The resulting unitary plastic structure 24 is then die cut into identification tags 2.

Figure 5:
FIG. 5 illustrates the various layers of the tag.

FIG. 5 is a cross sectional view of the fusing process illustrating the unitary plastic structure 24 and particularly the fusing of the layers of the polyethylene 25, 26 which results in the polyethylene unistructure 27. Printed images 28 are thus fully imbedded and protected from external abrasion or other hostile environs by the layers of surface polyester 29 on the polyethylene unistructure 27.

Figure 6:
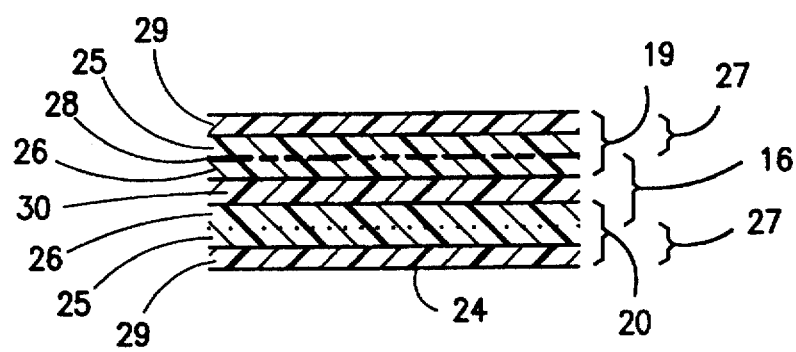
FIG. 6 illustrates the layers of the tag.

FIG. 6 illustrates a cross sectional view of the preferred materials used in the laminating process resulting in the unitary plastic structure 24. FIG. 6 shows a layer of clear polyethylene 25 of overlaminates 19 and 20 fused onto a respective layer of polyethylene 26 on both sides of the opaque polyester core 30 of the printable substrate web 16 resulting in the unitary plastic structure 24. Imprinted images 28 are then affixed and imbedded into the desired unitary polyethylene structure 27 of the unitary plastic structure 24. The clear polyester layer 29 of the overlaminates 19 and 20 form the external protective surface of the plastic unistructure 24. It is to be understood that if images are printed on the bottom side of the core substrate, the same will be equally imbedded in the lower bottom layer of the unitary polyethylene structure 27 of the plastic unistructure 24.

The identification tag 2 may be manufactured from any of a variety of suitable materials that are widely known and used in the art including polyesters such as polyethylene glycol esters, cellulose esters such as acetate, triacetate and butyrate, vinyl resins such as copolymers of vinyl acetate and vinyl chloride, polyethylene and the like. Polyester and polyethylene combinations are the preferred materials for use in the present invention, the former providing the identification tag its resiliency, the latter its thermoplasticity.

The preferred composition and dimensional thicknesses of the various materials for the pre-printed substrate are approximately 0.003"/0.004"/0.003" for a polyethylene-polyester-polyethylene combination and 0.005" for the overlaminating plastic cover, which may be clear, colorless, or colored. The preferred composition and dimensional thickness for the polyethylene-polyester overlaminate combination with the polyester eventually being on the outside is approximately 0.002"/0.003". In order to obtain more flexible identification tags, the thicknesses of the various layers may be reduced, especially the polyester, to such values as 0.001"/0.003"/0.001" and 0.001"/0.002" for example, or if more rigid and therefore thicker identification tags are desired, the values may be increased to 0.003"/0.005"/0.003" and 0.004"/0.006", respectively.

Human and/or machine readable information is printed onto the plastic substrate 16 using processes widely known for the initiated in the art such as flexography, computer-direct Indigo™ type process, hotstamping, thermal transfer, ink jet, dot matrix, laser and the like, both front and back if desired, and in black or in color.

The invention does not limit the size, shape, form or flexibility of the identification tag, thus providing the advantage in its application as an animal identification tag to resist snagging on fences, trees and the like which reduces tearing or injuring the body portion of the animal to which the identification tag is affixed.

Although the invention has been shown and described with respect to a preferred embodiment thereof, it would be understood by those skilled in the art that other various changes, omissions and additions thereto may be made without departing from the spirit and scope of the present invention.

I claim:

1. An anchor for use with an identification tag, the identification tag having an aperture to receive a portion of an animal-piercing member, the animal piercing member having a retaining surface, comprising:

(a) a main body including an integral boss having a central aperture therethrough, the main body extending to an internal shoulder for contacting the retaining surface of the animal-piercing member to preclude passage of the retaining surface in a longitudinal direction while permitting passage in an opposite direction;

(b) a continuous, uninterrupted tapered fitting surface defining an end of the anchor;

(c) a peripheral groove for having a diameter less than the diameter of the aperture of the identification tag;

(d) an outer convexly rounded surface intermediate the tapered fitting surface and the groove; and (e) a circumferential flange projecting radially outwardly from an outer surface of the body to locate the groove intermediate to the outer convexly rounded surface and the flange, the flange having an outside diameter greater than the outer convexly rounded surface;

wherein the central aperture comprises a first diameter defined by inner walls of the circumferential flange, tapered fitting surface, peripheral groove, and outer convexly rounded surface, and a second diameter defined by an inner wall of the main body, wherein the second diameter is greater than the first diameter;

and wherein a larger portion of the central aperture is defined by the second diameter than by the first diameter.

2. The anchor of claim 1 wherein the main body has a length and the tapered fitting surface, peripheral groove, and outer convexly rounded surface together have a combined length, wherein the length of the main body is at least twice the combined length of the tapered fitting surface, peripheral groove, and outer convexly rounded surface.

3. The anchor of claim 1 wherein the main body has an outer diameter smaller than the outer diameter of the flange, and wherein an external shoulder is formed at the junction between the flange and the main body.

* * * * *